Dec. 10, 1940.  R. C. TAFT  2,224,556
HOEING IMPLEMENT AND THE LIKE
Filed Sept. 13, 1937
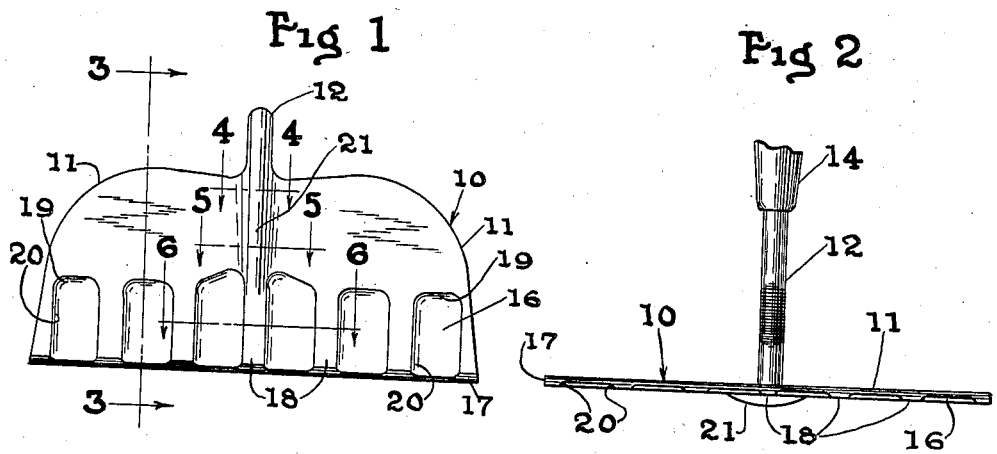
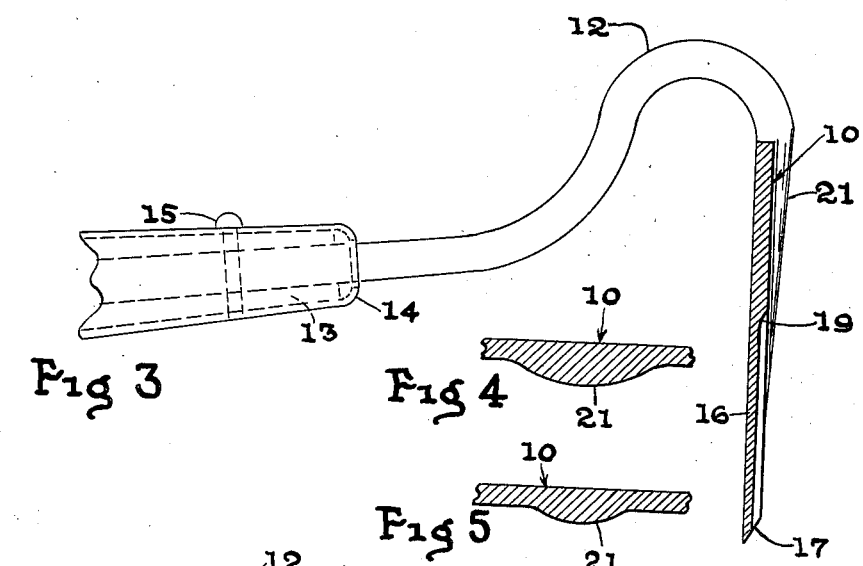
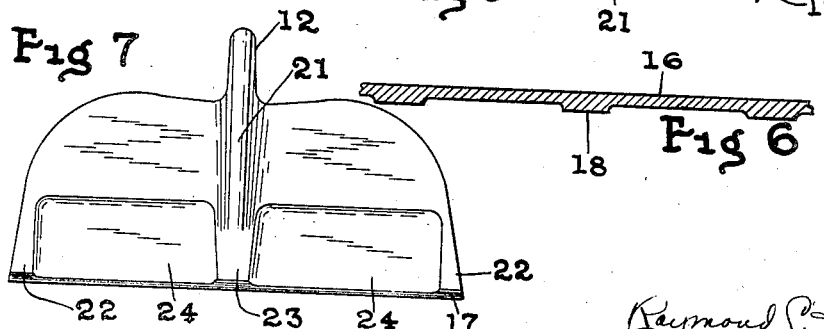
INVENTOR.
Raymond C. Taft
BY
His ATTORNEY.

Patented Dec. 10, 1940

2,224,556

UNITED STATES PATENT OFFICE 2,224,556

HOEING IMPLEMENT AND THE LIKE

Raymond C. Taft, Wallingford, Vt., assignor to The American Fork & Hoe Company, Cleveland, Ohio, a corporation of Ohio Application September 13, 1937, Serial No. 163,584

4 Claims. (Cl. 97—65)

This invention relates to hoeing implements and the like, and relates more particularly to an improved blade for implements of this general type.

The prior art hoes and the like implements with which I am familiar, are provided with a relatively thick blade of substantially uniform thickness necessitated by the strain to which the blade is subjected when employed in breaking up earth or for similar purposes. However, the cutting edges of such hoes become dull, after a short period of use and the thickness of the blade renders it difficult to force the blade through the soil.

I have devised a hoe blade which is relatively thin but which is provided with strengthening ribs to enable the blade to withstand the strains to which an implement blade of this type is subjected. Additionally, due to the thinness of the blade the cutting edge is maintained relatively sharp for a longer period than the cutting edge of the aforementioned conventional hoe blade.

It is an object of my invention to provide a hoe or like implement having an improved blade having improved cutting means reinforced to withstand the strains encountered in use.

Another object of my invention is to provide an improved blade for hoeing implements or the like which may be forced through the soil relatively easily.

Another object of my invention is to provide an improved blade for hoeing implements or the like having a relatively thin sharp cutting edge which will maintain its cutting qualities for a relatively long period.

Another object of my invention is to provide an improved blade for hoeing implements or the like having a relatively thin cutting edge reinforced by strengthening means to enable it to withstand strains encountered in the use of such implements.

Other objects of my invention and the invention itself will become increasingly apparent in a consideration of the following description and drawing, wherein:

Fig. 1 is a rear elevational view of a hoe embodying my invention;

Fig. 2 is a bottom plan view of the hoe illustrated in Fig. 1;

Fig. 3 is a transverse sectional view taken along line 3—3 of Fig. 1;

Fig. 4 is a section taken along the line 4—4 of Fig. 1;

Fig. 5 is a sectional view taken along line 5—5 of Fig. 1;

Fig. 6 is a sectional view taken along line 6—6 of Fig. 1;

Fig. 7 is a rear elevational view of a hoe embodying a modified form of my invention.

Referring now to the drawing, I have illustrated generally at 10 a hoe blade 11 having a curved shank formed integrally therewith, the shank 12 being inserted within a recess provided therefor in a conventional handle 13 encased by a tubular metallic socket 14 and secured by a pin 15 projected through the socket, the handle and the shank. The manner of affixing the hoe blade to the handle constitutes no essential part of my invention and any well known means may be employed for this purpose.

The portion of the length of the blade 11 which extends from its cutting edge 17, formed by bevelling the generally lowermost disposed end of the blade to the longitudinally medial portion of the blade is relatively thin as best indicated at 16 in Fig. 3, and comprises a plurality of integrally formed, vertically extending and laterally spaced sections or ribs 18 extending from the thicker upper blade portion and having their face surfaces in substantial transverse alignment. The thin blade portion 16 is thus separated into a plurality of laterally spaced thin portions each of which is substantially wider throughout its longitudinal extent than either of its associated ribs and merges gradually with the relatively thicker upper blade portion as indicated at 19, Fig. 3, and the ribs 18 merge gradually laterally with the thin blade portion 16, as indicated at 20, Fig. 2.

The center ridge of the shank 12, in the modification of my invention illustrated in Figs. 1-6 incl., as indicated at 21, merges gradually with the central rib 18 and above the central rib 18 merges gradually laterally with the upper portion of the blade, as best illustrated in Figs. 4 and 5.

The relatively thin blade portion 16 offers a minimum of resistance in biting through the soil due to the thinness of the blade and to the gradual merger of the ribs 18 with the thin portion of the blade 16 and since there are no sharp shoulders to impede passage of the blade through the soil. Also, due to the thinness of the blade portions 16 as compared to the relative thickness of the conventional hoe blade, the blade remains effective for breaking up soil for a considerable period even though the cutting edge 17 of the same becomes worn or somewhat dulled from use.

I have illustrated in Fig. 7, a modified form of blade, generally similar to that illustrated in Figs. 1 to 6 incl., but wherein only three ribs are provided such as end ribs 22—22 and a centrally disposed rib 23. In this modification the thin portions of the blade indicated at 24—24 extend for a considerable distance longitudinally of the blade and relatively little resistance is offered by the blade in breaking up earth or similar operations, although the ribs reinforce the blade to a considerable degree against transverse bending stresses when pulling the blade toward or pushing the blade from the user of the implement.

Although I have shown and described preferred forms of my invention, I contemplate that numerous and extensive departures may be made therefrom without departing from the spirit of my invention or the scope of the appended claims.

Having thus described my invention what I claim is:

1. In a hoe, a blade therefor, said blade having a relatively thick portion adjacent its handle portion and a relatively thin portion adjacent its cutting edge, said relatively thick portion having dependent portions disposed between spaced portions of the relatively thin portions, and a cutting edge disposed at the forward face of the blade formed by bevelling the blade bottom edge including said dependent portions angularly relative to the blade forward face.

2. In a hoe, a blade therefor, said blade comprising a handle, said blade comprising means to secure the blade to a handle, said blade having a forwardly disposed cutting edge formed by bevelling the bottom edge of the blade, that portion of the blade which extends from the longitudinal medial portion thereof to the cutting edge comprising a plurality of laterally spaced sections which are relatively thicker and narrower throughout substantially their longitudinal extent than intervening relatively wider sections separating said first named sections, said first named sections being of the same relative thickness as that portion of the blade which extends from the longitudinal medial portion thereof to the handle securing means.

3. In a hoe, a blade therefor, said blade comprising means to secure the blade to a handle, said blade having a forwardly disposed cutting edge formed by bevelling the bottom edge of the blade, that portion of the length of the blade which extends from the cutting edge to the longitudinally medial portion of the blade comprising a plurality of relatively laterally spaced sections which are substantially thinner and wider throughout substantially their entire longitudinal extent than intervening relatively narrower sections separating said thin portions which are approximately of the same thickness as that portion of the blade disposed from the longitudinally medial portion thereof to the handle securing means, said relatively thinner spaced sections merging gradually with the relatively thicker portion of the blade disposed nearest the blade securing means.

4. In a hoe, a blade therefor having a planular forward face, a shank formed integrally with the blade and extending rearwardly therefrom, said blade having a forwardly disposed bevelled cutting edge, a portion of the length of the said blade which extends from the cutting edge to the longitudinally medial portion of the blade comprising a plurality of relatively laterally spaced sections which are relatively thinner and wider throughout their entire longitudinal extent than intervening relatively narrower sections separating said thin wider portions, which narrower sections constitute extensions of said portion of the length of the said blade which extends from the longitudinally medial portion of the blade to the shank end of the blade, said cutting edge disposed at the forward face of the blade formed by bevelling the blade bottom edge including said extensions coincident therewith angularly relative to the blade forward face.

RAYMOND C. TAFT.